TEMPERATURE COMPENSATED DELAY LINE

Filed Oct. 3, 1955

INVENTORS.
BERNARD M. GORDON
HANS R. MEYER
BY Jacob Trachtman
ATTORNEY.

United States Patent Office 2,935,704

Patented May 3, 1960

2,935,704

TEMPERATURE COMPENSATED DELAY LINE

Bernard M. Gordon, Concord, and Hans R. Meyer, Boston, Mass., assignors to Epsco, Incorporated, Boston, Mass., a corporation of Massachusetts Application October 3, 1955, Serial No. 538,238

2 Claims. (Cl. 333—29)

Figure 1:
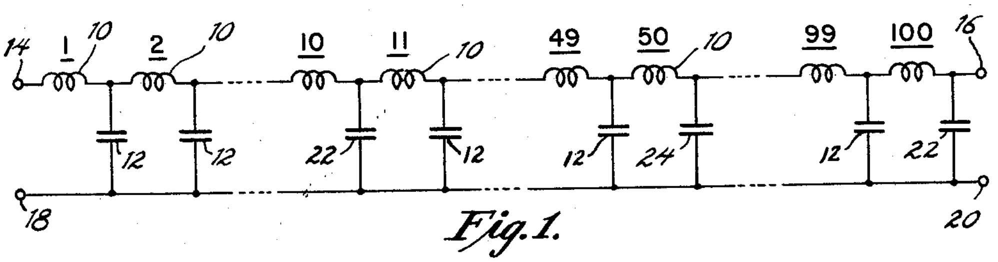

This invention relates to delay lines, and more particularly to signal delay lines provided with temperature compensation.

In many instances it is important that a delay device provide a constant predetermined delay which is not affected by changes in temperature. This is especially true in situations where it is not possible to control the temperature or because such temperature control would be prohibitive in cost. Such temperature compensation also allows the production of delay lines of very high precision which are of great importance in the electronic arts.

It is therefore, a principal object of the invention to provide a new and improved delay line which produces a substantially constant delay with changes in temperature over a given range.

Another object of the invention is to provide a new and improved temperature compensated signal delay line of great precision.

Still another object of the invention is to provide a new and improved temperature compensated signal delay line utilizing standard circuit configurations and combinations of components.

Yet another object of the invention is to provide a new and improved temperature compensated delay line which does not require additional components or circuitry.

A further object of the invention is to provide a new and improved temperature compensated signal delay line which may be manufactured in the usual manner and has the appearance and all the advantages of standard delay lines.

Still a further object of the invention is to provide a new and improved temperature compensated delay line which may be designed for minimum deviation in delay about a specifically determined temperature.

Yet a further object of the invention is to provide a new and improved temperature compensated delay line which minimizes deviations in delay with changes of temperature above and below a predetermined temperature.

Another object of the invention is to provide a temperature compensated delay line which minimizes non-linear as well as linear deviations in delay with change of temperature.

Still another object of the invention is to provide a new and improved temperature compensated delay line using standard inductive and capacitive elements.

Yet another object of the invention is to provide a new and improved temperature compensated delay line which can readily be designed for various delays and in which the deviations with temperature may be controlled within a required degree of precision.

A further object of the invention is to provide a new and improved temperature compensated delay line which may be easily and economically manufactured.

The above as well as many other objects and advantages of the invention are achieved by providing a delay line which may be of the standard L-section type utilizing inductors and capacitors. Inductors generally have temperature coefficients which are positive, while capacitors may have temperature coefficients which may be either positive or negative. Capacitor units are chosen for use with the inductors of the delay line so that their combined effective temperature coefficient of delay is positive. Certain of the said capacitor units are replaced by capacitor elements which have temperature coefficients which are negative. By selecting a sufficient number of capacitors with a negative temperature coefficient, a line is produced which has a delay that is substantially constant. This is especially true when the inductive and capacitive units and elements have linear temperature coefficients which can precisely compensate each other.

In the case where for one reason or another non-linearity is present in the deviations with temperature of the various units and elements of the delay line, then, the number of capacitive elements having a temperature coefficient which is negative, is selected so that the deviation in delay above and below a predetermined temperature is equal.

The resulting deviation in the same direction above and below the said predetermined temperature is compensated for by a linearity correcting section including a capacitor which section has a delay deviation characteristic above and below the said predetermined temperature which is opposite to and substantially equal with the resultant delay of the other sections. This results in a total delay which is substantially constant with change of temperature throughout a given range.

The foregoing and other objects of the invention will become more apparent as the following detailed description of the invention is read in conjunction with the drawings, in which:

Figure 1 is a schematic representation with portions omitted, of a temperature compensated delay line embodying the invention.

Figure 2:
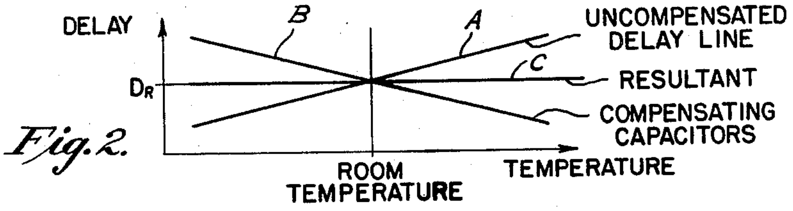
Figure 3:
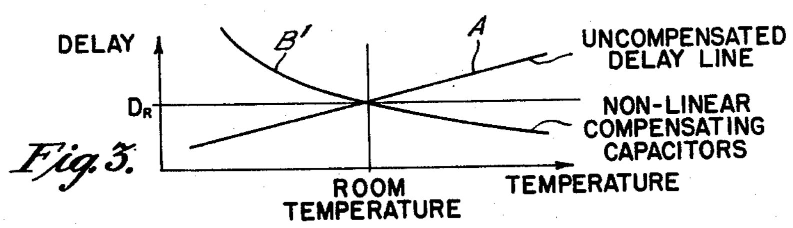
Figure 4:
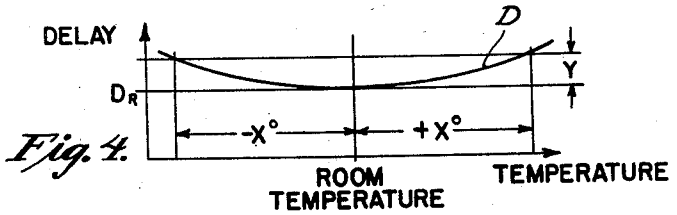
Figure 5:
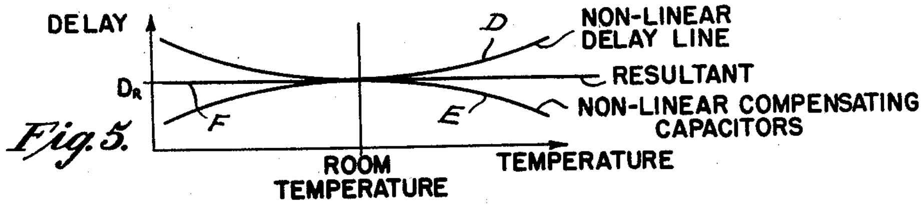

Figure 2 is a graphic representation of the linear deviations in the delay of an uncompensated delay line, deviations in the delay of sections having compensating capacitor elements, and the resultant, Figure 3 is a graphic representation of the deviations in delay of the uncompensated delay line, and the non-linear deviations produced by sections having compensating capacitor elements, Figure 4 is a graphic representation of the resultant deviations in delay produced by the combination of the curves of Figure 3, and Figure 5 is a graphic representation illustrating the resultant of the curve shown in Figure 4 and the deviations of delay of a non-linear compensating section.

Like numerals represent like parts throughout the several views.

Refer now to Figure 1 which illustrates in schematic form a temperature compensated delay line embodying the invention. The temperature compensated delay line may be of the L-section type or any of the other conventional constructions. The temperature compensated delay line illustrated comprises a plurality of sections 1 to 100 each comprising an inductor 10 and a capacitor unit 12 unless otherwise indicated. The inductors 10 are series connected extending from the input terminal 14 of the delay line to its output terminal 16. The capacitor units 12 each have one of their terminals connected to a respective one of the junctions of the inductor units 10, while their other terminals are connected together and to the input and output terminals 18 and 20.

The inductor units 10 may be pi wound, toroidal, solenoid, or of other form. These inductive units 10 generally have a coefficient of delay which is positive and linear in form. The capacitors 12 generally in use have a temperature coefficient which is either positive or negative. For example, the capacitor units 12 of the type commercially known as characteristic F, have a temperature coefficient which is positive and substantially linear, while the commercial ceramic capacitors have a temperature coeffiicent which is negative and non-linear. The slope of the curve representing capacity as a function of temperature of ceramic capacitors is generally greater for reduced temperatures.

In the illustrated delay line the capacitor units 12 are of the mica type having a temperature coefficient which is positive and linear.

Referring to Figure 2, the line A shows the deviation in delay produced by the sections having inductive units 10 and capacitive units 12 giving a combined effective temperature coefficient of delay which is positive and linear. The positive nature of this coefficient is illustrated by the positive slope of the line A. It is noted that the delay deviates below the delay shown for room temperature as the temperature decreases below this level, while the deviation rises above the delay at room temperature when the temperature is increased.

In place of the capacitors 12, the delay line is provided with capacitor elements 22 in certain of its sections which may be equally positioned along the line. The sections including capacitor elements 22 have a combined effective temperature coefficient of delay which is negative and illustrated by the line B of Figure 2. The number of sections having capacitors 22 are such that their effective temperature coefficient of delay which is illustrated by the slope of line B, is equal to the temperature coefficient of the uncompensated delay line illustrated by the slope A, but negative with respect thereto. This results in a delay line which is fully compensated having a constant delay illustrated by the line C.

In Figure 2 it has been assumed that the line B is linear. In practice however non-linearity in the deviation of the delay is generally present, and the capacity of ceramic capacitor elements having a negative compensating temperature coefficient varies nonlinearly as a function of temperature. This is illustrated in Figure 3 by the non-linear curve B′.

The resultant of the curves A and B′ is shown by the curve D of Figure 4.

Because of the non-linearity present which may in part be due to the deviations in delay which are illustrated by the curve B′, the curve D of Figure 4 illustrating the resultant deviations in delay, is not constant and cannot be made so by changing the number of non-linear compensating capacitor elements 22. The number of non-linear compensating capacitor elements 22, however, is selected so that the delay deviates in the same direction and in substantially equal amounts at temperatures above and below a predetermined temperature, which may be room temperature. For example, at temperatures of −X degrees and +X degrees an increase in the delay of the amount Y takes place in the direction above the delay at room temperature $D_R$ as illustrated by Figure 4.

Figure 5 illustrates the manner in which the non-linear deviations in delay illustrated by curve D are corrected by a section having a non-linear capacitor component 24. The section including capacitor component 24 provides a delay which deviates in the manner shown by the curve E of Figure 5. Each section including a linearity correcting capacitive component 22 produces a nonlinear component of signal delay variation which deviates in the same direction for temperatures above and below the room temperature. The deviations in the delay introduced by the section having component 24 is in the direction opposite to and is substantially equal with the deviations of the resultant delay illustrated by the curve D. Thereby the combination of the deviations in delay illustrated by curves D and E, produces a resultant curve F which is the delay $D_R$ at room temperature and which is maintained constant with changes in temperature.

A capacitor component 24 giving the deviations in delay characterized by the curve E may be provided by commercially available ceramic capacitors which may be selected so that their maximum delay value occurs at room temperature or at any other predetermined temperature.

Merely for the purpose of illustrating a particular design and embodiment of the temperature compensated delay line the following example is presented. A temperature compensated delay line of 200 micro-seconds is provided with 100 sections each having a delay of 2 micro-seconds. The inductance units 10 may be of 800 micro-henrys, while the capacitors 12, 22 and 24 are each of 5000 micromicro-farads. The air core coils each have a positive deviation of 25 parts per million for each degree centrigrade, while 90 mica capacitor units 12 have a positive deviation of 40 parts per million for each degree centrigrade. This gives a total of 6100 parts per million for each degree centrigrade.

The positive deviation of 6100 parts per million for the inductor units 10 and capacitor units 12 is counteracted by nine capacitor elements 22, each of which should have a negative deviation of approximately 700 parts per million. The total value of the negative deviation of the compensating capacitor elements 22 is varied to produce a curve representing a deviation similar to that shown by D of Figure 4. The compensating capacitors 22 may be equally spaced along the delay line so that they come within the sections 10, 20, 30, 40, 60, 70, 80, 90 and 100

The linearity correcting capacitor component 24 is chosen to appropriately match the curve D as shown by curve E (Figure 5) for producing a resultant delay which is constant with changes in temperature. The linearity compensating capacitor component 24 is thus chosen to oppositely match the particular non-linearity involved and is chosen accordingly. The capacitor 24 may be positioned in section 50 which is the central section of the delay line.

It will, of course, be understood that the description and drawings, herein contained are illustrative merely, and that various modifications and changes may be made in the selection and arrangement of the components and circuits without departing from the spirit of the invention.

What is claimed is:

1. A delay line for providing a predetermined precise delay regardless of temperature variations over a broad range of temperatures including a predetermined temperature near the temperature at which said delay line is operated comprising, a plurality of first sections each formed of a series inductor and shunt first capacitor, at least one first temperature compensating section formed of a series inductor and shunt second capacitor, at least one second temperature compensating section formed of a series inductor and shunt third capacitor, said first sections primarily controlling the delay furnished by said delay line, the inductance and capacitance of said inductor and first capacitor respectively being a linear function of temperature whereby the delay imparted by each first section is a linear function of temperature, and means for cascading said first sections with said first and second temperature compensating sections to form said delay line, the capacitance of said second and third capacitors being first and second functions of temperature respectively, said first function including a linear component whereby said first temperature compensating sections introduce delay deviations as a function of temperature substantially exactly cancelling temperature-sensitive delay deviations introduced by said first sections, said first function also including a nonlinear component resulting in said first temperature compensating sections introducing delay deviations of opposite sense on opposite sides of said predetermined temperature, said second function including a nonlinear component whereby said second temperature compensating sections introduce delay deviations substantially exactly cancelling those introduced by said first temperature compensating sections due to said first function nonlinear component, said first and second temperature compensating sections thereby coacting to cancel variations in delay furnished by said first sections due to temperature variations.

2. A delay line for providing a predetermined precise delay regardless of temperature variations over a broad range of temperatures centered generally about room temperature comprising, a plurality of first sections each formed of a series inductor and shunt first capacitor, at least one second section formed of a series inductor and shunt second capacitor having a capacity which varies as a first function of temperature, at least one third section formed of a series inductor and shunt third capacitor having a capacity which varies as a second function of temperature, said series inductors and said first capacitors having inductances and capacities respectively which increase linearly as temperature increases to introduce a variation in delay furnished by said first sections which varies linearly and directly as a function of temperature, said first function having a linear component which decreases with increasing temperature to introduce a variation in delay furnished by said second sections which decreases linearly as temperature increases to cancel said temperature dependent delay variations introduced by said first sections and a nonlinear component which increases and decreases with temperature on opposite sides of a predetermined room temperature to introduce variations in delay furnished by said second sections which vary as a non-linear function of temperature, said second function having only a nonlinear component varying oppositely to said increases and decreases to introduce a variation in delay furnished by said third sections to cancel said variations non-linearly related to temperature introduced by said second sections, said first, second and third sections being cascaded to provide a delay line furnishing said precise delay which remains constant independently of temperature.

References Cited in the file of this patent

UNITED STATES PATENTS

| | | |
|---|---|---|
| 1,882,397 | Pierce | Oct. 11, 1932 |
| 2,231,389 | Koffyberg | Feb. 11, 1941 |
| 2,235,019 | Johannson | Mar. 18, 1941 |
| 2,281,461 | Smith | Apr. 28, 1942 |
| 2,310,797 | Lea | Feb. 9, 1943 |
| 2,326,742 | Abraham et al. | Aug. 17, 1943 |
| 2,326,770 | Edwards | Aug. 17, 1943 |
| 2,326,826 | Bullington | Aug. 17, 1943 |
| 2,407,294 | Shockley et al. | Sept. 10, 1946 |
| 2,447,485 | Biquard | Aug. 24, 1948 |
| 2,589,076 | Hancock et al. | Mar. 11, 1952 |